(12) United States Patent
Golla et al.

(10) Patent No.: US 9,414,309 B2
(45) Date of Patent: Aug. 9, 2016

(54) MOBILE TERMINAL

(71) Applicant: Intel Deutschland GmbH, Neubiberg (DE)

(72) Inventors: Prasad Vara Venkata Satya Golla, Singapore (SG); Marcus Hagn, Munich (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 529 days.

(21) Appl. No.: 13/678,636

(22) Filed: Nov. 16, 2012

(65) Prior Publication Data

US 2014/0141844 A1     May 22, 2014

(51) Int. Cl.
    *H04M 1/00*      (2006.01)
    *H04W 52/00*     (2009.01)
    *H04W 52/02*     (2009.01)

(52) U.S. Cl.
    CPC .......... *H04W 52/00* (2013.01); *H04W 52/0296* (2013.01)

(58) Field of Classification Search
    CPC ..... H04M 1/0262; H04M 19/08; H04M 1/04; Y02E 60/12; H04B 1/3883; H04B 1/1615; H04W 52/02; H04W 52/0229; H04W 52/0225; H04W 52/028; H02J 7/0044; H02J 17/00
    See application file for complete search history.

(56) References Cited

U.S. PATENT DOCUMENTS

| | | | | |
|---|---|---|---|---|
| 6,636,751 | B1 * | 10/2003 | McCartney | 455/573 |
| 8,583,075 | B2 * | 11/2013 | Chen et al. | 455/574 |
| 8,670,801 | B2 | 3/2014 | Levionnais et al. | |
| 2008/0108396 | A1 | 5/2008 | Lundqvist | |
| 2012/0295669 | A1 * | 11/2012 | Zhou | 455/572 |
| 2013/0072255 | A1 | 3/2013 | Levionnais et al. | |
| 2013/0162203 | A1 * | 6/2013 | Kamata | H02J 7/025 320/108 |
| 2015/0288282 | A1 * | 10/2015 | Isham | G06F 1/26 323/283 |

FOREIGN PATENT DOCUMENTS

| | | | |
|---|---|---|---|
| CN | 101013903 | * | 8/2007 |
| CN | 101013903 A | | 8/2007 |
| CN | 201142684 Y | | 10/2008 |
| CN | 201878132 | * | 6/2011 |
| CN | 201878132 U | | 6/2011 |
| CN | 102209129 A | | 10/2011 |
| WO | 2011148086 A1 | | 12/2011 |

OTHER PUBLICATIONS

Office Action received for Chinese Patent Application No. 201310721676.5, dated May 4, 2015, 10 pages of office Action and 13 pages Of English translation.

* cited by examiner

*Primary Examiner* — Lana N Le

(57) ABSTRACT

A mobile terminal is provided comprising a component to be supplied with power having a power input terminal, a radio receiver configured to receive electromagnetic power wherein the radio receiver has a first power output terminal coupled to the power input terminal and a power supply circuit wherein the power supply circuit has a second power output terminal which is coupled to the power input terminal bypassing the radio receiver.

19 Claims, 6 Drawing Sheets

MOBILE TERMINAL

TECHNICAL FIELD

The present disclosure relates to mobile terminals.

BACKGROUND

A mobile terminal such as a cell phone may, in addition to communication via a cellular mobile communication network, support near field communication (NFC) which for example allows using the mobile terminal as a train ticket, electronic wallet etc. It may be desirable or necessary that such a functionality is supported even if the main battery of the mobile terminal is exhausted. This can be done by drawing the required power from a NFC reader on which the mobile terminal is placed. It is desirable that the power supply by means of the energy received via NFC is implemented efficiently and at low cost.

SUMMARY

A mobile terminal is provided including a component to be supplied with power having a power input terminal, a radio receiver configured to receive electromagnetic power wherein the radio receiver has a first power output terminal coupled to the power input terminal and a power supply circuit wherein the power supply circuit has a second power output terminal which is coupled to the power input terminal bypassing the radio receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
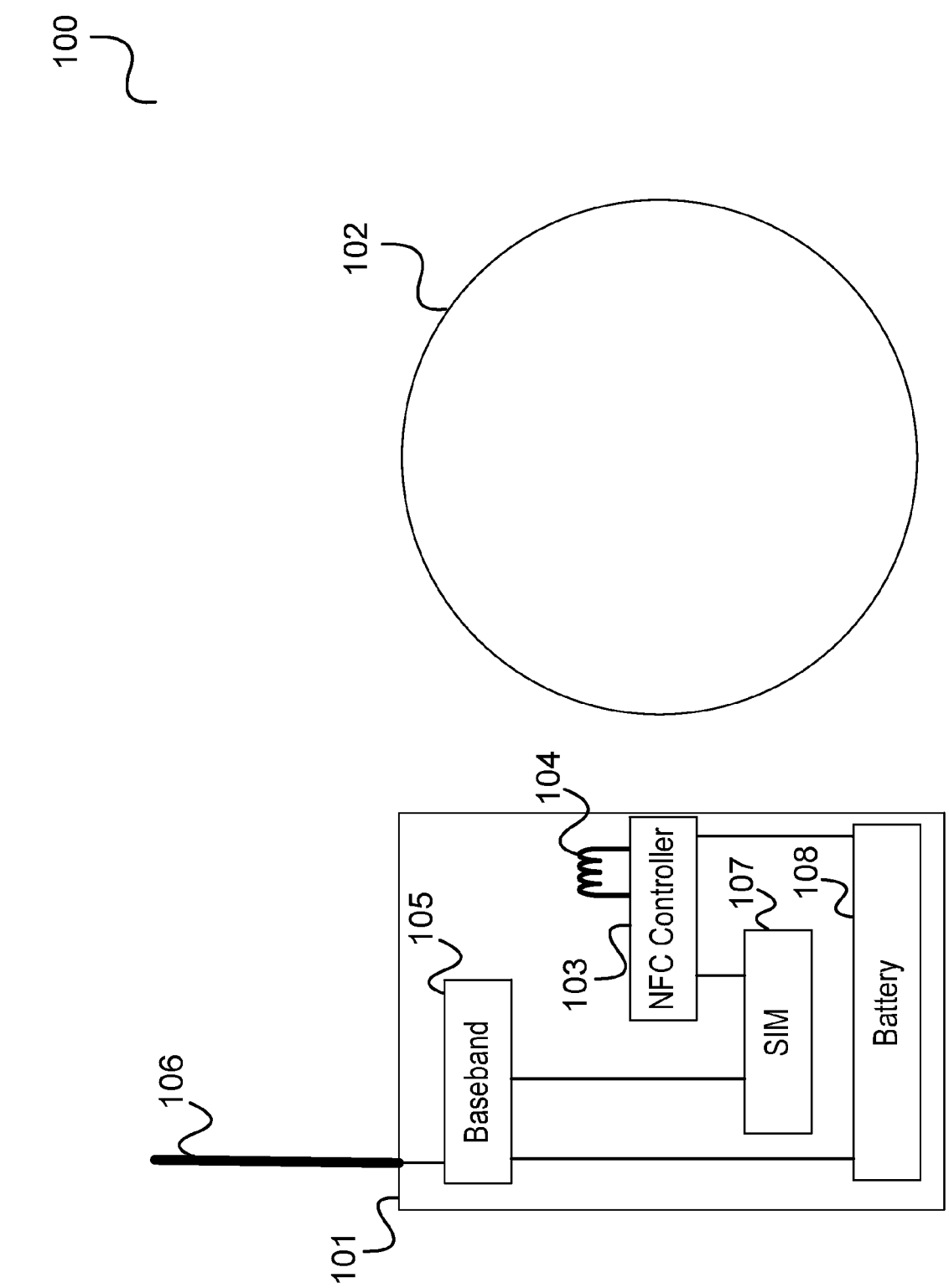
FIG. 1 shows a communication arrangement.

FIG. 1 shows a communication arrangement 100.

The communication arrangement 100 includes a mobile terminal 101 and an NFC (Near Field Communication) reader 102.

The mobile terminal 101 includes a NFC controller 103 and an NFC antenna 104 for NFC communication with the NFC reader 102.

The mobile terminal 101 further includes a baseband circuit 105 (e.g. including a baseband modem) and a cellular antenna 106 for communication with a base station of a mobile communication network, e.g. according to GSM (Global System for Mobile Communications), UMTS (Universal Mobile Telecommunication System) or LTE (Long Term Evolution).

Further, the mobile terminal 101 includes a SIM (Subscriber Identity Module) card 107 coupled with both the baseband circuit 105 and the NFC controller 103. The SIM card 107 may communicate with the mobile communication network via the baseband circuit 105 or with the NFC reader 102 via the NFC controller 103.

A battery 108 of the mobile terminal 101 supplies the baseband circuit 105 and the NFC controller 103 with power. The SIM card 107 may be supplied with power from the battery via the baseband circuit 105.

By means of the NFC controller 103 and the NFC antenna 104, the mobile terminal 101 can operate as a NFC device. NFC devices are meant to work when the battery (in this example the battery 108) is in off mode, e.g. is discharged. The NFC controller 103 may be required to interact with the SIM card 107 as the SIM card 107 may for example act as a secure element e.g. connected through SWP (Single Wire Protocol) with the NFC controller 103.

For example, the mobile terminal 101 is configured that a user may place it on the reader 102 at the entrance of a departure train station for checking in and may place it on a similar reader 102 at the exit of his destination train station for checking out and the fare is deducted from a credit balance of the user based on the distance between the departure train station and the destination train station. In this case the SIM card 107 may act as secure element ensuring a correct calculation of the amount to be deducted from the user's credit balance.

In order for the SIM card 107 to work it requires current to operate (e.g. to wake up from a standby). The case may arise that the battery 108 is discharged while the user is on the train. In this case, power may be supplied to the SIM card 107 by the NFC controller 103.

This is described in more detail in the following with reference to FIG. 2.

Figure 2:
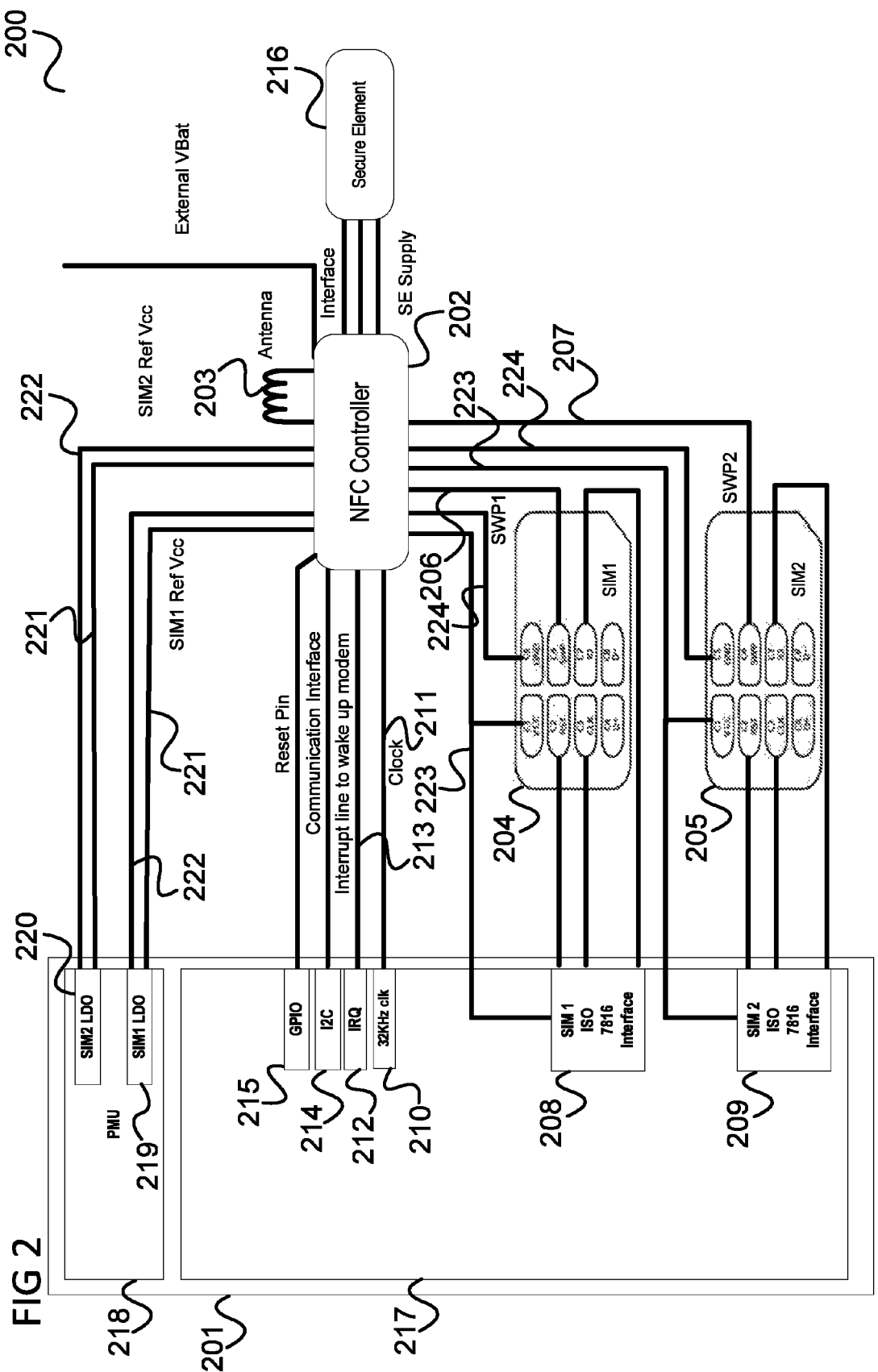
FIG. 2 shows a mobile terminal.

FIG. 2 shows a mobile terminal 200.

Similar to the mobile terminal 100, the mobile terminal 200 includes a baseband circuit 201, an NFC controller 202 and an NFC antenna 203. The mobile terminal 200 in this example includes two SIM cards, a first SIM card 204 and a second SIM card 205, corresponding to the SIM card 107. The NFC controller 202 is coupled with the first SIM card 204 via a first SWP connection 206 and is coupled with the second SIM card 205 via a second SWP connection 207.

The baseband circuit 201 includes a first SIM interface 208 coupled to the first SIM card 204 (e.g. for exchange of a reset signal, a clock signal and input/output data) and a second SIM interface 209 coupled to the second SIM card 205 (e.g. for exchange of a reset signal, a clock signal and input/output data).

The baseband circuit 201 further includes a clock generator 210 providing a clock signal to the NFC controller 202 via a clock line 211, an interrupt generator 212 providing (if needed) an interrupt signal to the NFC controller 202 via an interrupt line 213, a communication interface 214 to the NFC controller 202 and a general purpose input/output pin 215 connected to the NFC controller 202, e.g. used for sending a reset signal to the NFC controller 202.

The mobile terminal 200 may further include a secure element 216 coupled with the NFC controller 202 which may (like the SIM cards 204, 205) be used for services requiring secure processing such as electronic payment. The secure element 216 is for example coupled with the NFC controller 202 via various communication lines and interfaces.

The baseband circuit 201 includes a baseband processor 217 and a power management unit 218. The power management unit 218 includes a first LDO 219 for supplying the first SIM card 204 and a second LDO 220 for supplying the second SIM card 205. In this example, the first LDO 219 and the second LDO 220 are connected to the NFC controller 202 by means of a first supply lines 221 and first ground lines 222.

The SIM cards 204, 205 perform negotiations on the power level (like 3V or 1.8V) of the power to be supplied to the SIM cards 204, 205 with the baseband circuit 201. The negotiated voltage is also referred to as reference voltage.

The reference voltage is supplied to the NFC controller 202 by means of the first supply lines 221.

The NFC controller 202 supplies the correct voltage to the SIM cards 204, 205 based on the reference voltage via second supply lines 223 and second ground lines 224. This may happen in two ways:

1) The NFC controller 202 generates, based on the reference voltage, a voltage similar to the reference voltage (possibly with an acceptable voltage drop), e.g. using power from the battery 108. In this case, the reference voltage can be seen as an analogue control of the voltage generated by the NFC controller 202. The NFC controller 202 supplies this voltage to the SIM cards 204, 205.

2) The NFC controller 202 lets the reference voltage pass through to the SIM cards 204, 205. Such a pass-through introduces, due to the required circuitry (e.g. switches), a voltage drop which may be about 100 mV and thus raises the requirements for the power management unit 218.

In both cases, the supply of the reference voltage to the NFC controller 103 requires additional contacts of the NFC controller 103 (e.g. solder balls of the NFC controller package). For example, for a DSDS (Dual SIM DUAL Standby) mobile phone having more than one SIM card 107 like the mobile terminal 300 this may be three or four additional contacts. Further, the supply of a 3V SIM card may require additional circuitry in the NFC controller 202.

In the following, a mobile terminal is described with reference to FIG. 3 which can be seen to address these issues.

Figure 3:
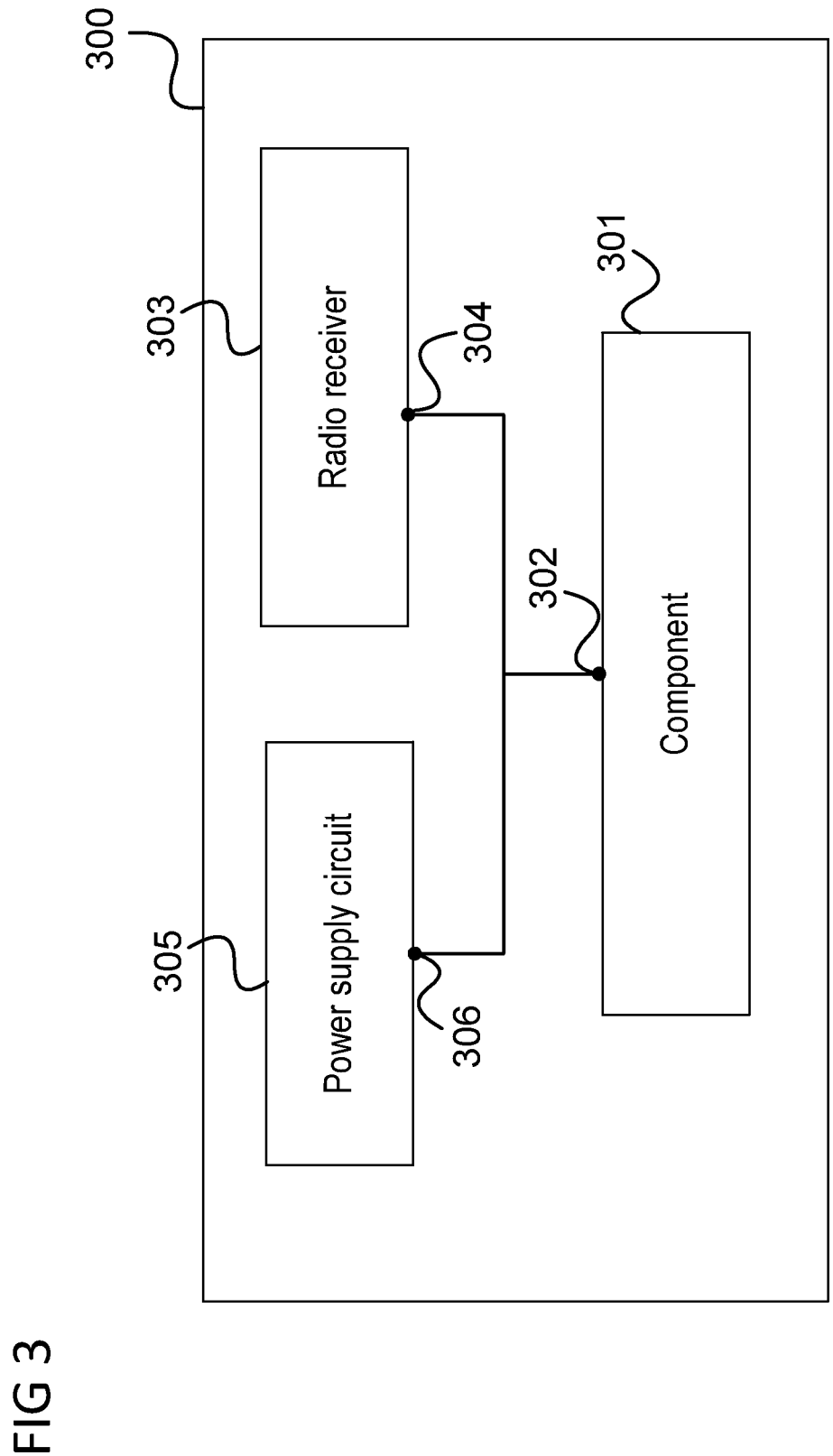
FIG. 3 shows a mobile terminal in which a power supply circuit is connected to a component to be supplied with power bypassing a radio receiver.

FIG. 3 shows a mobile terminal 300.

The mobile terminal 300 includes a component 301 to be supplied with power having a power input terminal 302.

The mobile terminal 300 further includes a radio receiver 303 configured to receive electromagnetic power wherein the radio receiver 303 has a first power output terminal 304 coupled to the power input terminal 302.

Further, the mobile terminal 300 includes a power supply circuit 305 wherein the power supply circuit has a second power output terminal 306 which is coupled to the power input terminal bypassing the radio receiver 303.

In other words, a power supply is connected to the component to be supplied with power wherein the connection bypasses the radio receiver and current backflow into the power supply (and thus, e.g., into a battery of the mobile terminal) from the radio receiver is prevented in one operation mode, e.g. in an operation mode when the radio receiver outputs power to the power input terminal of the component.

The radio receiver 303, e.g. a NFC controller, does for example not receive a reference voltage (e.g. a SIM reference voltage) from the power supply circuit 305, e.g. a power management unit, via its input contacts.

The power supply circuit may include a current backflow protection element configured, in a first operation mode, to allow current flow from the power supply circuit to the component and, in a second operation mode, to prevent power flow from the radio receiver to the power supply circuit.

For example, in the first operation mode, the power supply circuit supplies the component with power and in the second operation mode, the radio receiver supplies the component with power.

For example, in the second operation mode, the radio receiver outputs power via the first output power terminal to the power input terminal of the component.

In the second operation mode, the radio receiver for example supplies the component with power using the received electromagnetic power.

The power supply circuit may include a low dropout regulator configured to supply the component with power in the first operation mode via the second power output terminal.

In the second operation mode, the second power output terminal may for example have a high impedance state.

For example, the backflow protection element is a transistor and wherein the mobile terminal includes a controller configured to turn the transistor on in the first operation mode and configured to turn the transistor off in the second operation mode.

The backflow protection element may also be a diode.

The mobile terminal may include a battery coupled with the power supply circuit and the power supply circuit configured to supply the component with power in the first operation mode using power from the battery.

The mobile terminal is for example configured to enter the second operation mode when the charging level of the battery is too low to supply the component with power.

The radio receiver is for example a near field communication receiver.

The first power output terminal and the second power output terminal may for example be short-circuited.

The component to be supplied with power is for example a secure component.

For example, the component to be supplied with power is a circuit card.

The component to be supplied is for example a SIM card.

The power supply circuit is for example a power management unit.

The mobile terminal may, further include a baseband circuit including the power supply circuit.

The mobile terminal may further include a baseband circuit configured to transmit a digital indication of a voltage level of the power to be supplied to the component to the radio receiver and the radio receiver is for example configured to supply power to the component according to the voltage level in the second operation mode.

An example of a mobile terminal according to the mobile terminal 300 is described in the following in greater detail.

Figure 4:
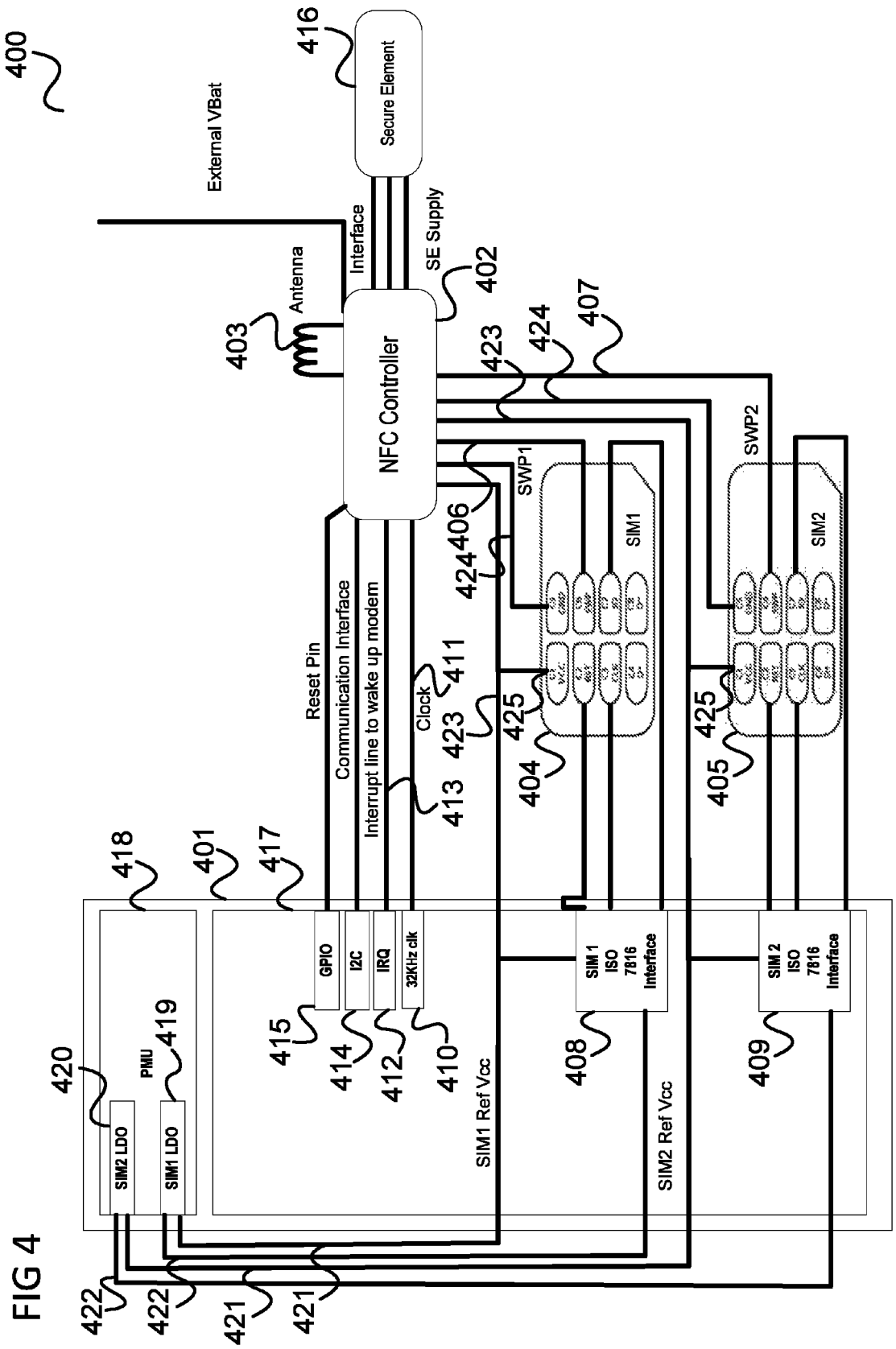
FIG. 4 shows a mobile terminal in which a power supply circuit is connected to a component to be supplied with power bypassing a radio receiver in greater detail.

FIG. 4 shows a mobile terminal 400.

Analogously to the mobile terminal 200, the mobile terminal 400 includes a baseband circuit 401, an NFC controller 402, an NFC antenna 403, a first SIM card 404, a second SIM card 405, SWP connections 406, 407, SIM interfaces 408, 409, a clock generator 410, a clock line 411, an interrupt generator 412, an interrupt line 413, a communication interface 414, a general purpose input/output pin 415, a secure element 416, a baseband processor 417, a power management unit 418, SIM LDOs 419, 420, supply lines 421, 423 and ground lines 422, 424.

The functionality of these components may be similar as explained for the corresponding components of the mobile terminal 200 unless stated differently in the following.

It should be noted that the ground lines 422, 424 are optional and a connection to the ground of the various components may also be implemented by a connection of the ground potential node of the mobile terminal.

In contrast to the first power supply lines 221 of the mobile terminal 200, the first power supply lines 421 are connected to power inputs 425 of the SIM cards 404, 405 directly, i.e. bypassing the NFC controller 402.

Thus, the power management unit 418 may supply the SIM cards 404, 405 with power without passing through the NFC controller 402. For example, to handle a 3V supply of the SIM cards 404, 405 (to which the NFC controller 402 may for example not be able in any case) instead of a pass through, the SIM LDOs 419, 420 directly supply power to the SIM cards 404, 405 (e.g. when the mobile terminal 400 is active).

For supplying the SIM cards 404, 405 with 1.8V, for example, the power supply may depend on whether the power management circuit 418 or the NFC controller 403 can supply more current. For example, when the battery is charged, the power management circuit 418 is typically able to supply more power than the NFC controller and supplies the SIM cards 404, 405 in this case.

The mode in which the power management circuit 418 supplies the SIM cards 404, 405 can be seen as the first operation mode described with reference to FIG. 3.

In case the battery is exhausted, a second operation mode may be entered which is also referred to as power by field mode in the following. In the power by field mode, in which there is no current coming from the power management unit 418 due to battery exhaust condition, only the NFC controller 402 supplies power using power harvested from the electromagnetic field generated by the NFC reader 102. So, in this mode, the NFC controller 402 directly supplies the SIM cards 404, 405 with power.

In the power by field mode the power management unit 418 may be completely shut down and no battery power may be available for the NFC controller to work. For example, as described above, the user uses the mobile terminal 400 as a train ticket and still requires to travel (or for example needs to check out in the destination train station) although the battery of his mobile terminal is exhausted. In this case, the NFC controller 402 harvests energy from the electromagnetic field generated by the NFC reader 102 (e.g. when the user places the mobile terminal 400 on the reader for checking out) and powers up one or both of the SIM cards 404, 405 as needed. For example, a train ticket or wallet application needed for checking out resides on one of the SIM cards 404, 405 and the NFC controller 402 supplies that SIM card 404, 405 with power.

The first SIM LDO 419 and the second SIM LDO 420 each include a current backflow element preventing current backflow into the power management unit when the NFC controller 202 supplies power to the SIM cards 404, 405, i.e. in the second operation mode.

For example, the outputs of the SIM LDOs may be switched to an high impedance state (i.e. are tristate outputs). Such tristate outputs can be implemented at low cost such that the use of tri-states in chip design and control (e.g. of the LDO outputs) with software and logic allows saving costs, e.g. compared to the mobile terminal illustrated in FIG. 2 while providing the same functionality.

Figure 5:
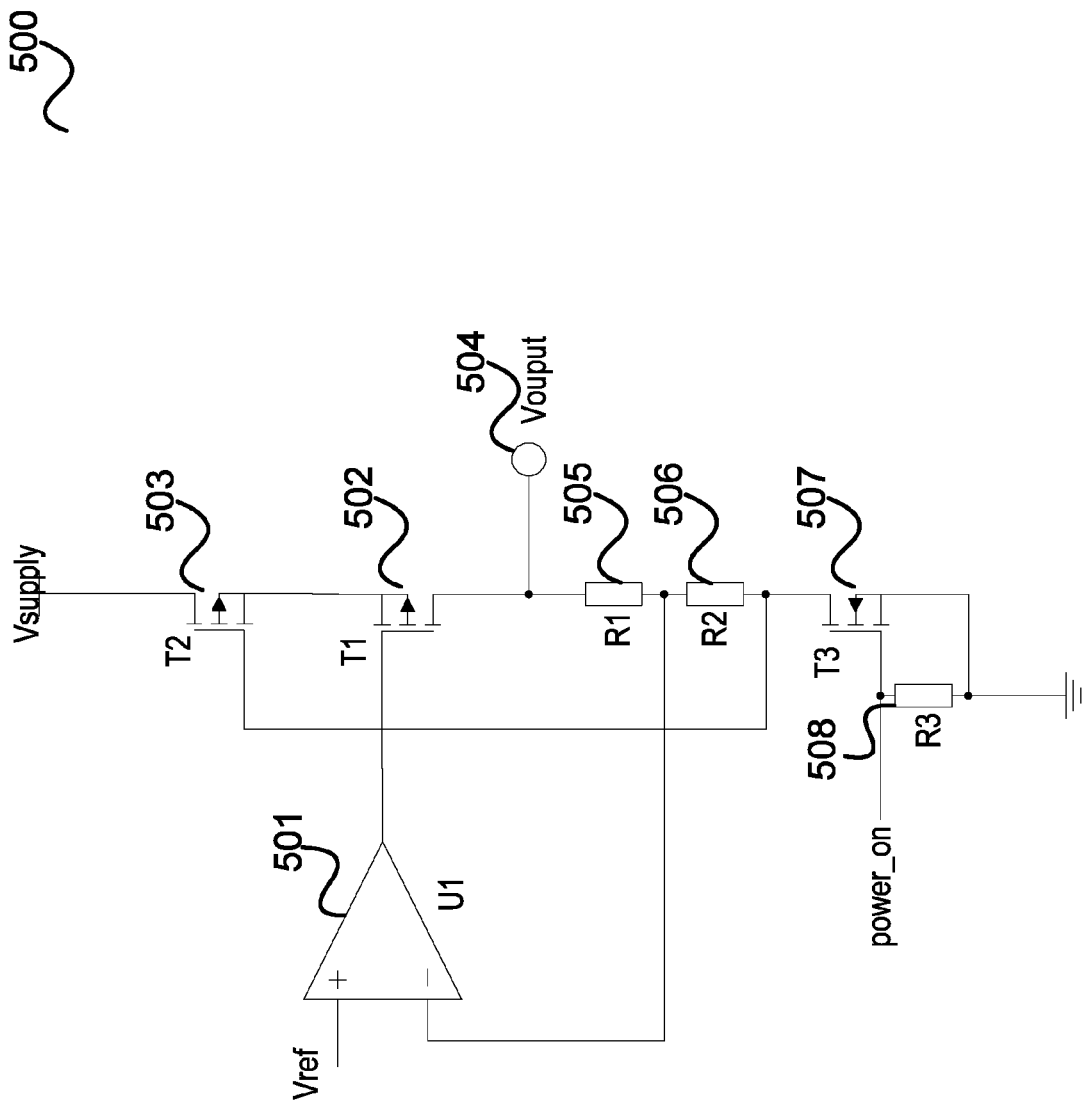
FIG. 5 shows an LDO with a transistor as backflow protection element.

An example of an LDO with a tristate output that may be used as the first SIM LDO 419 or the second SIM LDO 402 is illustrated in FIG. 5.

FIG. 5 shows an LDO 500.

The LDO 500 includes an operational amplifier 501. Its inverting input is supplied with a reference voltage $V_{ref}$ which is for example the voltage with which the corresponding SIM card 404, 405 is to be supplied as for example negotiated between the SIM card 404, 405 and the baseband circuit 201.

The output of the operational amplifier 501 is connected to the gate of a first p-channel field effect transistor 502 (e.g. a PMOS) whose source is connected to the drain of a second p-channel field effect transistor 503 and whose drain is connected to an output terminal 504 of the LDO 500. The source of the second p-channel field effect transistor 503 is connected to a supply voltage $V_{supply}$ which is for example supplied by the battery 108.

A first resistor 505 is connected between the output terminal 504 and the inverting input of the operational amplifier 501. A second resistor 506 is connected between the inverting input of the operational amplifier 501 and the drain of a n-channel field effect transistor 507 (e.g. an NMOS). Further, the gate of the second p-channel field effect transistor 503 is connected to the drain of the n-channel field effect transistor 507.

The source of the n-channel field effect transistor 507 is connected to ground. The gate of the n-channel field effect transistor 507 is supplied with a power_on signal which indicates whether the LDO 500 is to output a current via the output terminal 504 (power_on high) or whether the output terminal 504 should be in a high impedance state (power_on low).

A third resistor 508 is coupled between the gate of the n-channel field effect transistor 507 and ground.

The first p-channel field effect transistor 502 together with the operational amplifier 501 and the resistive divider (voltage divider) formed by the first resistor 505 and the second resistor 506 can be seen to form a standard LDO. The additional circuitry including the second p-channel field effect transistor 503, the n-channel field effect transistor 507 and the third resistor 508 are configured to set the output terminal 504 to an high impedance state (if power_on is low) even if the supply voltage $V_{supply}$ and the internal power supply of the LDO 500 are 0V (when the battery is discharged). It should be noted that when power_on is low the n-channel field effect transistor is switched off and, at least when the NFC controller 402 supplies power, the second p-channel field effect transistor 503 is also switched off due to the output terminal 504 being raised to the high voltage level by the NFC controller 402 such that current supplied by the NFC controller 402 cannot flow via the second p-channel field effect transistor and, for example, into the battery 108.

Another possible LDO implementation that may be used for the SIM LDOs 419, 420 using a diode as current backflow protection element.

Figure 6:
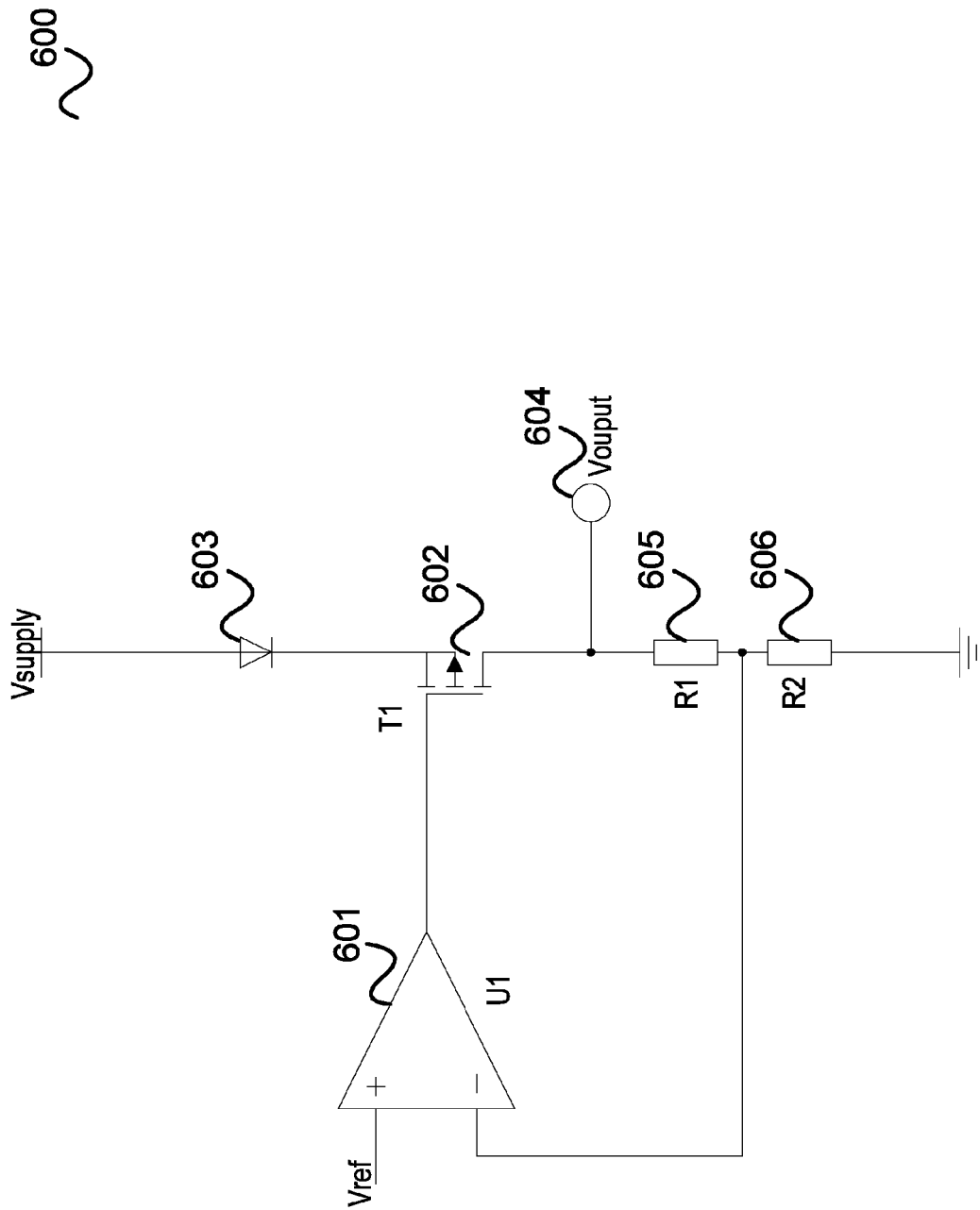
FIG. 6 shows an LDO with a diode transistor as backflow protection element

FIG. 6 shows an LDO 600.

The LDO 600 includes an operational amplifier 601. Its inverting input is supplied with a reference voltage $V_{ref}$ which is for example the voltage with which the corresponding SIM card 404, 405 is to be supplied as for example negotiated between the SIM card 404, 405 and the baseband circuit 201.

The output of the operational amplifier 601 is connected to the gate of a p-channel field effect transistor 602 (e.g. a PMOS) whose source is connected, via a diode 603, to a supply voltage $V_{supply}$ which is for example supplied by the battery 108 and whose drain is connected to an output terminal 604 of the LDO 600.

A first resistor 605 is connected between the output terminal 604 and the inverting input of the operational amplifier 601. A second resistor 606 is connected between the inverting input of the operational amplifier 601 and ground.

The p-channel field effect transistor 602 together with the operational amplifier 601 and the resistive divider (voltage divider) formed by the first resistor 605 and the second resistor 606 can be seen to form a standard LDO.

The diode 603 prevents a back current from the output terminal 604 to the supply voltage terminal (e.g. into the battery) in case that $V_{supply}$ is smaller than the voltage at the output terminal 604, e.g. in case NFC controller 402 supplies power to the SIM card 604, 605.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A mobile terminal comprising:
    a component to be supplied with power from a main power supply and an alternative power supply via a power input terminal, wherein the component to be supplied with power is a secure component;
    a radio receiver configured as the alternative power supply to receive electromagnetic power wherein the radio receiver has a first power output terminal coupled to the power input terminal; and
    a baseband circuit comprising a power supply circuit configured as the main power supply wherein the power supply circuit has a second power output terminal which is coupled to the power input terminal bypassing the radio receiver; wherein the radio receiver does not receive an analog reference voltage from the power supply circuit via its input contacts, the analog reference voltage providing a voltage level of the power to be supplied to the component negotiated between the component and the baseband circuit.

2. The mobile terminal of claim 1,
    wherein the power supply circuit comprises a current backflow protection element configured, in a first operation mode, to allow current flow from the power supply circuit to the component and, in a second operation mode, to prevent power flow from the radio receiver to the power supply circuit.

3. The mobile terminal of claim 2, wherein in the first operation mode, the power supply circuit supplies the component with power and in the second operation mode, the radio receiver supplies the component with power.

4. The mobile terminal of claim 2, wherein in the second operation mode, the radio receiver outputs power via the first output power terminal to the power input terminal of the component.

5. The mobile terminal of claim 2, wherein in the second operation mode, the radio receiver supplies the component with power using the received electromagnetic power.

6. The mobile terminal of claim 2, wherein the power supply circuit comprises a low dropout regulator configured to supply the component with power in the first operation mode via the second power output terminal.

7. The mobile terminal of claim 6,
    wherein the low dropout regulator has a tri-state output.

8. The mobile terminal of claim 2, wherein, in the second operation mode, the second power output terminal has a high impedance state.

9. The mobile terminal of claim 2, wherein the backflow protection element is a transistor and wherein the mobile terminal comprises a controller configured to turn the transistor on in the first operation mode and configured to turn the transistor off in the second operation mode.

10. The mobile terminal of claim 2, wherein the backflow protection element is a diode.

11. The mobile terminal of claim 2, wherein the mobile terminal comprises a battery coupled with the power supply circuit and the power supply circuit configured to supply the component with power in the first operation mode using power from the battery.

12. The mobile terminal of claim 11, the mobile terminal configured to enter the second operation mode when the charging level of the battery is too low to supply the component with power.

13. The mobile terminal of claim 2, wherein the baseband circuit is configured to transmit a digital indication of a voltage level of the power to be supplied to the component to the radio receiver; and
    the radio receiver configured to supply power to the component according to the voltage level in the second operation mode.

14. The mobile terminal of claim 1, wherein the radio receiver is a near field communication receiver.

15. The mobile terminal of claim 1, wherein the first power output terminal and the second power output terminal are short-circuited.

16. The mobile terminal of claim 1, wherein the component to be supplied with power is a circuit card.

17. The mobile terminal of claim 1, wherein the component to be supplied is a SIM card.

18. The mobile terminal of claim 1, wherein the power supply circuit is a power management unit.

19. The mobile terminal of claim 1,
    wherein the radio receiver directly supplies a voltage to the component.

* * * * *